C. & H. C. BECK.
LENS FOR PROJECTION AND PHOTOGRAPHY.
APPLICATION FILED JUNE 6, 1911.
1,035,408. Patented Aug. 13, 1912.
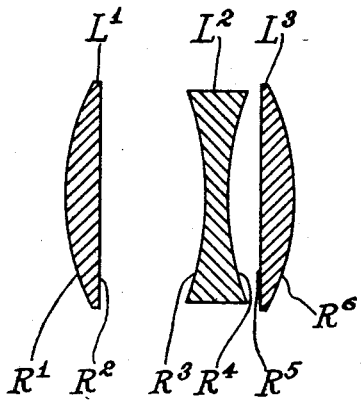

UNITED STATES PATENT OFFICE.

CONRAD BECK AND HORACE C. BECK, OF LONDON, ENGLAND.

LENS FOR PROJECTION AND PHOTOGRAPHY.

1,035,408. Specification of Letters Patent. Patented Aug. 13, 1912.

Application filed June 6, 1911. Serial No. 631,534.

*To all whom it may concern:*

Be it known that we, CONRAD BECK and HORACE COURTHOPE BECK, subjects of the King of Great Britain, residing at London, England, have invented new and useful Improvements in Lenses for Projection and Photography, of which the following is a specification.

Our invention relates to combination lenses having three separated lenses, two positive, one on each side of a negative.

The object of this invention is to construct an improved lens of this type having a very large aperture preferably of at least one quarter its focus, in which the chromatic, spherical, astigmatic and other oblique errors are corrected to a great degree of accuracy over an angle of view of about 30 to 40 degrees and in which the component lenses are not powerful.

The two positive lenses are plano convex or approximately plano-convex and constructed of a glass with high refraction and low dispersion. The negative lens is an unequal biconcave lens of approximately the same refractive index but greater dispersion. The radii of curvature are preferably in the ratio of 25 to 26. The radius of curvature of both of the positive lenses is approximately three tenths of the focal length of the finished lens, and the distances between the six surfaces of the complete lens may be as follows:—Surface $R^1$ to $R^2$ 26 thousandths of the focus of complete lens, surface $R^2$ to $R^3$ 100 thousandths of the focus of complete lens, surface $R^3$ to $R^4$ 31 thousandths of the focus of complete lens, surface $R^4$ to $R^5$ 62 thousandths of the focus of complete lens, surface $R^5$ to $R^6$ 26 thousandths of the focus of complete lens. These data may be varied as regards curvature to a small extent, and as regards distances between the surfaces to a considerable extent. By this means we can construct a lens of a very large aperture not less than 2/9 of the focal length of the combination, and with curves of relatively large radius of curvature, the individual lenses having relative long focal lengths, all of them being more than 3/10 of the combined focus when the positive power of the complete lens is equally distributed between the two positive components, but in any case the focal length of the negative lens is more than 3/10 of the combined focus. Thus the cost of a large aperture projection or photographic lens is very greatly reduced.

In the construction of corrected lenses the errors of a single positive lens are counteracted by similar but opposite errors in a negative lens. The combination of two such lenses of great power produces a lens of low power. In anastigmatic lenses the powers of the individual lenses have been great and the errors which are thus counterbalanced very great. Thus if as in our invention a formula can be devised in which the component lenses need not be powerful the individual errors to be corrected are smaller and any slight alteration due to manufacture is less appreciable than when powerful lenses with great errors are used. Thus lower power individual lenses are much to be preferred. Low power lenses are much more economical to manufacture as the curvature of the surfaces is less. This formula in our invention for lenses of the large aperture of $f4$ or larger requires that the three lenses should have a refractive index approximately equal. We have found in our experience that the conditions required to correct radial and tangential astigmatism at the same time as central aberration are more easily satisfied with a small number of curves when the refraction of the glass is the same, a difference in refractive index requiring either a greater number of curves or more powerful component lenses. We find that there are certain advantages in very small differences in the refraction of the glass for perfecting some of the other corrections which may be introduced without essentially altering our formula but if large alteration in the refractive indices exceeding about two per cent. be made our formula would not apply.

We have found that in order to make a lens that is equally serviceable for photographing objects full size and for reducing it is advantageous to have a system which is approximately symmetrical so that the curves are similar on either side of the center of the system, but we place our central lens slightly out of the center of the system and consequently may have slightly different curves on the two sides of the central lens though a difference greater than ten per cent. will damage the astigmatic corrections. The lens is also shorter in length than is usual with large aperture lenses.

The drawing shows a lens manufactured according to our invention. The data and particulars of a lens of 10 inch focus having one plano-convex positive lens, one approximately plano-convex positive lens and one bi-concave negative lens are as follows:—

| Radii of curvature. | Refractive index. $\mu_D$ | Dispersive ratio. $\nu$ value |
|---|---|---|
| Lens $L^1$ $R^1$ +3.392 inches | 1.612 | 58.3 |
| $R^2$ ∞ | | |
| Lens $L^2$ $R^3$ −4.27 inches | 1.618 | 37.7 |
| $R^4$ −4.11 inches | | |
| Lens $L^3$ $R^5$ −49.5 inches | 1.612 | 58.3 |
| $R^6$ +3.32 inches | | |

It will be noticed that the negative lens is bi-concave and that one curve is more powerful than the other to the maximum extent of ten per cent.

Central distance of $R^1$ to $R^2$ .31 inch, central distance of $R^2$ to $R^3$ 1.15 inch, central distance of $R^3$ to $R^4$ .31 inch, central distance of $R^4$ to $R^5$ .65 inch, central distance of $R^5$ to $R^6$ .31 inch; aperture of lens $L^1$ 2.8 inches, aperture of lens $L^2$ .6 inches, aperture of lens $L^3$ 2.8 inches.

The lens is used for photography with lens $L^1$ nearest to the view, for projection with lens $L^1$ nearest to the enlarged image.

When the lens is to be made with an aperture not less than two ninths of the focal length of the combination the refractive index for the line D of the glasses of the three lenses should not differ by more than two per cent.

We do not limit ourselves to the refractive index of the glass used, considerable modification being possible with compensating alterations in the separation between the lenses.

What we claim is:—

1. A lens for projection and photography, spherically, chromatically, and astigmatically corrected, consisting of two positive lenses and one negative lens separated by air spaces, in which the negative lens has a focal length greater than three tenths of the focal length of the combination.

2. A lens for projection and photography, spherically, chromatically, and astigmatically corrected, consisting of two positive lenses and one negative lens separated by air spaces, with an aperture not less than two ninths of the focal length of the combination, in which the negative lens has a focal length greater than three tenths of the combination.

3. A lens for projection and photography, spherically, chromatically, and astigmatically corrected, consisting of two positive lenses and one negative lens separated by air spaces, with an aperture not less than two ninths of the focal length of the combination, in which the negative lens has a focal length greater than three tenths of the focal length of the combination, and in which the refractive index for the line D of the glasses of the three lenses does not differ by more than two per cent.

4. A lens for projection and photography, spherically, chromatically, and astigmatically corrected, consisting of two positive lenses and one negative lens separated by air spaces, with an aperture not less than two ninths of the focal length of the combination, in which the negative lens has a focal length greater than three tenths of the focal length of the combination, the two positive lenses being lenses in which one curve has a power at least six times as powerful as the other, the negative lens being double concave with one curve not more than ten per cent. more powerful than the other, the two positive lenses being placed on either side of the negative lens.

5. A lens for projection and photography, spherically, chromatically, and astigmatically corrected, consisting of two positive lenses and one negative lens separated by air spaces, with an aperture not less than two ninths of the focal length of the combination, in which the negative lens has a focal length greater than three tenths of the focal length of the combination, the two positive lenses being lenses in which one curve has a power at least six times as powerful as the other, the negative lens being double concave with one curve not more than ten per cent. more powerful than the other, the two positive lenses being placed on either side of the negative lens, and in which the refractive index for the line D of the glasses of the three lenses does not differ by more than two per cent.

In witness whereof we have hereunto set our hands in presence of two witnesses.

CONRAD BECK.
HORACE C. BECK.

Witnesses:
 ALFRED T. PATTEN,
 WM. GIRLING.